(12) United States Patent  
Nasir et al.

(10) Patent No.: US 12,386,892 B2
(45) Date of Patent: Aug. 12, 2025

(54) SYSTEMS AND METHODS FOR GENERATING IMPROVED CONTENT BASED ON MATCHING MAPPINGS

(71) Applicant: Adeia Guides Inc., San Jose, CA (US)

(72) Inventors: Sahir Nasir, San Jose, CA (US); Alan Waterman, Merced, CA (US)

(73) Assignee: ADEIA GUIDES INC., San Jose, CA (US)

( * ) Notice: Subject to any disclaimer, the term of this patent is extended or adjusted under 35 U.S.C. 154(b) by 0 days.

(21) Appl. No.: 18/416,110

(22) Filed: Jan. 18, 2024

(65) Prior Publication Data

US 2024/0152553 A1 May 9, 2024

Related U.S. Application Data

(63) Continuation of application No. 18/108,741, filed on Feb. 13, 2023, now Pat. No. 11,914,645, which is a
(Continued)

(51) Int. Cl.
*G06F 16/78* (2019.01)
*G06F 16/71* (2019.01)
(Continued)

(52) U.S. Cl.
CPC ............ *G06F 16/738* (2019.01); *G06F 16/71* (2019.01); *G06F 16/73* (2019.01); *G06F 16/783* (2019.01);
(Continued)

(58) Field of Classification Search
CPC .......... G06F 16/2379; G06F 16/24558; G06F 16/248; G06F 16/58; G06F 16/71;
(Continued)

(56) References Cited

U.S. PATENT DOCUMENTS 6,100,881 A   8/2000  Gibbons et al.
6,289,165 B1  9/2001  Abecassis
(Continued)

FOREIGN PATENT DOCUMENTS

CN    106530227 A    3/2017
JP    2005522108 A   7/2005
(Continued)

OTHER PUBLICATIONS

U.S. Appl. No. 17/358,728, filed Jun. 25, 2021, Alan Waterman.
(Continued)

*Primary Examiner* — Robert W Beausoliel, Jr.
*Assistant Examiner* — Nirav K Khakhar
(74) *Attorney, Agent, or Firm* — HALEY GUILIANO LLP

(57) ABSTRACT

Systems and methods are disclosed herein for generating content based on matching mappings by implementing deconstruction and reconstruction techniques. The system may retrieve a first content structure that includes a first object with a first mapping that includes a first list of attribute values. The system may then search content structures for a matching content structure having a second object with a second list of attributes and a second mapping including second attribute values corresponding to the second list of attributes. Upon finding a match, the system may generate a new content structure having the first object from the first content structure with the second mapping from the matching content structure. The system may then generate for output a new content segment based on the newly generated content structure.

14 Claims, 13 Drawing Sheets

Related U.S. Application Data continuation of application No. 16/844,511, filed on Apr. 9, 2020, now Pat. No. 11,604,827.

(60) Provisional application No. 62/979,732, filed on Feb. 21, 2020.

(51) Int. Cl.
| | |
|---|---|
| *G06F 16/73* | (2019.01) |
| *G06F 16/738* | (2019.01) |
| *G06F 16/783* | (2019.01) |
| *G06F 18/214* | (2023.01) |
| *G06F 18/24* | (2023.01) |
| *G06N 3/04* | (2023.01) |
| *G06N 3/08* | (2023.01) |
| *G06V 10/764* | (2022.01) |
| *G06V 10/82* | (2022.01) |
| *G06V 20/40* | (2022.01) |
| *G06V 40/12* | (2022.01) |
| *G06V 40/20* | (2022.01) |

(52) U.S. Cl.
CPC ...... *G06F 16/7837* (2019.01); *G06F 16/7867* (2019.01); *G06F 18/214* (2023.01); *G06F 18/24* (2023.01); *G06N 3/04* (2013.01); *G06N 3/08* (2013.01); *G06V 10/764* (2022.01); *G06V 10/82* (2022.01); *G06V 20/42* (2022.01); *G06V 20/47* (2022.01); *G06V 20/48* (2022.01); *G06V 20/49* (2022.01); *G06V 40/1365* (2022.01); *G06V 40/23* (2022.01)

(58) Field of Classification Search
CPC ...... G06F 16/73; G06F 16/738; G06F 16/739; G06F 16/783; G06F 16/7847; G06F 16/7867
See application file for complete search history.

(56) References Cited

U.S. PATENT DOCUMENTS

| | | |
|---|---|---|
| 7,756,945 B1 | 7/2010 | Andreessen et al. |
| 8,578,416 B1 | 11/2013 | Radloff et al. |
| 8,937,620 B1 | 1/2015 | Teller |
| 9,106,812 B1 | 8/2015 | Price et al. |
| 9,671,940 B1 | 6/2017 | Malik et al. |
| 10,074,200 B1 | 9/2018 | Yeturu |
| 10,665,030 B1 | 5/2020 | Shekhar et al. |
| 10,685,059 B2 | 6/2020 | Kim et al. |
| 11,082,757 B2 | 8/2021 | Waterman |
| 11,145,029 B2 | 10/2021 | Waterman |
| 11,195,554 B2 | 12/2021 | Waterman |
| 11,256,863 B2 | 2/2022 | Ahamed et al. |
| 11,562,016 B2 | 1/2023 | Saito et al. |
| 11,604,827 B2 | 3/2023 | Nasir et al. |
| 11,895,376 B2 | 2/2024 | Waterman |
| 11,914,645 B2 | 2/2024 | Nasir et al. |
| 11,921,792 B2 | 3/2024 | Kumar et al. |
| 11,934,777 B2 | 3/2024 | Ahamed et al. |
| 12,079,955 B2 | 9/2024 | Waterman |
| 12,165,675 B2 | 12/2024 | Waterman |
| 2003/0105750 A1 | 6/2003 | Chaboche |
| 2004/0004665 A1 | 1/2004 | Kashiwa |
| 2006/0194181 A1 | 8/2006 | Rosenberg |
| 2006/0230331 A1 | 10/2006 | Abanami et al. |
| 2006/0243555 A1 | 11/2006 | Lewis |
| 2007/0147654 A1 | 6/2007 | Clatworthy et al. |
| 2007/0296723 A1 | 12/2007 | Williams |
| 2007/0300157 A1 | 12/2007 | Clausi et al. |
| 2008/0055316 A1 | 3/2008 | Pahud et al. |
| 2008/0165194 A1 | 7/2008 | Uranaka et al. |
| 2009/0144609 A1 | 6/2009 | Liang et al. |
| 2009/0210395 A1 | 8/2009 | Sedam |
| 2009/0240727 A1 | 9/2009 | Sheehan |
| 2010/0050083 A1 | 2/2010 | Axen et al. |
| 2010/0150526 A1 | 6/2010 | Rose et al. |
| 2011/0106656 A1 | 5/2011 | Schieffelin |
| 2011/0137753 A1 | 6/2011 | Moehrle |
| 2011/0153047 A1 | 6/2011 | Cameron et al. |
| 2011/0239119 A1 | 9/2011 | Phillips et al. |
| 2011/0261030 A1 | 10/2011 | Bullock |
| 2012/0005616 A1 | 1/2012 | Walsh et al. |
| 2013/0080881 A1 | 3/2013 | Goodspeed et al. |
| 2013/0127898 A1 | 5/2013 | Diverdi et al. |
| 2014/0164593 A1 | 6/2014 | Murray et al. |
| 2014/0207778 A1 | 7/2014 | Raichelgauz et al. |
| 2014/0314392 A1 | 10/2014 | Mate et al. |
| 2015/0011298 A1 | 1/2015 | Haid et al. |
| 2015/0016714 A1 | 1/2015 | Chui |
| 2015/0154192 A1 | 6/2015 | Lysne et al. |
| 2015/0254497 A1 | 9/2015 | Jang et al. |
| 2015/0269441 A1 | 9/2015 | Mj |
| 2016/0110612 A1 | 4/2016 | Sabripour et al. |
| 2017/0011280 A1 | 1/2017 | Soldevila et al. |
| 2017/0025152 A1 | 1/2017 | Jaime et al. |
| 2017/0097969 A1 | 4/2017 | Stein et al. |
| 2017/0098152 A1 | 4/2017 | Kerr et al. |
| 2017/0300748 A1 | 10/2017 | Austin et al. |
| 2017/0315966 A1 | 11/2017 | Iyer et al. |
| 2018/0107638 A1 | 4/2018 | Ekambaram et al. |
| 2018/0176661 A1 | 6/2018 | Varndell et al. |
| 2018/0225380 A1 | 8/2018 | Netto et al. |
| 2018/0300361 A1 | 10/2018 | Ben-Aharon et al. |
| 2018/0300958 A1 | 10/2018 | Schriber et al. |
| 2018/0308523 A1 | 10/2018 | Silvestri et al. |
| 2018/0356967 A1 | 12/2018 | Rasheed |
| 2019/0005699 A1* | 1/2019 | Anderson ............ G06F 16/953 |
| 2019/0107927 A1 | 4/2019 | Schriber et al. |
| 2019/0155955 A1 | 5/2019 | Castaneda et al. |
| 2019/0187870 A1 | 6/2019 | Bostick et al. |
| 2019/0188902 A1 | 6/2019 | Doig et al. |
| 2019/0267041 A1 | 8/2019 | Ricciardi |
| 2019/0304157 A1 | 10/2019 | Amer et al. |
| 2019/0370984 A1 | 12/2019 | Tsai et al. |
| 2020/0019370 A1 | 1/2020 | Doggett et al. |
| 2020/0098283 A1 | 3/2020 | Vaculin et al. |
| 2020/0233903 A1* | 7/2020 | Mashrabov .......... G06F 16/738 |
| 2020/0312368 A1 | 10/2020 | Waterman |
| 2020/0314508 A1 | 10/2020 | Waterman |
| 2020/0334246 A1 | 10/2020 | Chen et al. |
| 2020/0409990 A1 | 12/2020 | Saito et al. |
| 2021/0019368 A1 | 1/2021 | Ahamed et al. |
| 2021/0027427 A1 | 1/2021 | Waterman |
| 2021/0042258 A1 | 2/2021 | Hitchins |
| 2021/0117409 A1 | 4/2021 | O'Connor et al. |
| 2021/0263964 A1 | 8/2021 | Nasir et al. |
| 2021/0377629 A1 | 12/2021 | Waterman |
| 2021/0407044 A1 | 12/2021 | Waterman |
| 2022/0059134 A1 | 2/2022 | Waterman |
| 2022/0138415 A1 | 5/2022 | Ahamed et al. |
| 2023/0185848 A1 | 6/2023 | Nasir et al. |
| 2023/0229694 A1 | 7/2023 | Saito et al. |
| 2024/0160843 A1 | 5/2024 | Ahamed et al. |
| 2024/0205518 A1 | 6/2024 | Waterman |

FOREIGN PATENT DOCUMENTS

| | | |
|---|---|---|
| JP | 2008-539379 A | 11/2008 |
| JP | 2008539479 A | 11/2008 |
| WO | 2007/104372 A1 | 9/2007 |

OTHER PUBLICATIONS

U.S. Appl. No. 17/517,844, filed Nov. 3, 2021, Alan Waterman.
U.S. Appl. No. 18/392,398, filed Dec. 21, 2023, Alan Waterman.
U.S. Appl. No. 18/082,781, filed Dec. 16, 2022, Sakura Saito.
U.S. Appl. No. 17/578,114, filed Jan. 18, 2022, Shakir Sharfraz Ashfaq Ahamed.
U.S. Appl. No. 17/472,138, filed Sep. 10, 2021, Alan Waterman.

(56) References Cited

OTHER PUBLICATIONS

U.S. Appl. No. 18/422,998, filed Jan. 25, 2024, Shakir Sharfraz Ashfaq Ahamed.
PCT International Search Report and Written Opinion for International Application No. PCT/US2020/020075, dated Jun. 22, 2020 (14 pages).
PCT International Search Report and Written Opinion for International Application No. PCT/US2020/041121, dated Oct. 16, 2020 (17 pages).
Florescu, et al., "Storing and Querying XML Data using an RDMBS", Quarterly Bulletin of the Computer Society of the IEEE Technical Committee on Data Engineering, pp. 27-34 (1999).
Luebke, "A Developer's Survey of Polygonal Simplification Algorithms", IEEE Computer Graphics and Applications, pp. 24-35 (2002).
Po, et al., "Automatic 2D-to-3D video conversion technique based on depth-from-motion and color segmentation", IEEE10th International Conference, https://ieeexplore.ieee.org/abstract/document/5655850, Oct. 24-28, 2010 (4 pages).
Tsaftaris, et al., "Colorizing a Masterpiece", IEEE Signal Processing Magazine (7 pages) (2011).
Turk, "Re-Tiling Polygonal Surfaces", Computer Graphics and Interactive Techniques, pp. 55-64 (1992).
U.S. Appl. No. 18/790,082, filed Jul. 31, 2024, Alan Waterman.

\* cited by examiner

200

Content Segment 202

Content Segment 204

Content Segment 206

Attribute Table 203

Attribute Table 205

Attribute Table 207

Training Data 210

Neural Network 212

→ Baseball Swing Hash
→ Soccer Kick Hash
→ Hockey Slapshot Hash

Input Layer   Hidden Layer   Output Layer

600

Pseudo code

```
content_structure_ID = CS133
    attribute_table_ID = AT131
        object_data_structure_ID = ODS134
            description_structure_ID = DS135
                object_ID = 111
                    object_type = human
                        object_feature_0 = male
                        object_feature_1 = 40_years
                        object_feature_2 = blue_jeans
                        object_feature_3 = brown_wavy_hair
                        object_feature_4 = Tom Hanks
                        object_feature_5 = Holding bat
                        ...
                        object_state_0 = Moving Bat Back
                        object_state_1 = Moving Bat Above Head
                        object_state_2 = Moving Bat Forward
                        object_state_3 = Bat Follow Through
                        object_state_4 = Vector Depiction of Bat object_ID = 112
                    object_type = Back Stand
                        object_feature_0 = Background
                        object_feature_1 = Menlo Text
                        object_state_1 = Stationary action_structure_ID = AS136
            action_0 (111, 112, Standing)
            action_1 (111, 113, Running)
            ...
```

Pseudo code

```
content_structure_ID = CS133
    mapping_ID = M132
        for (object_ID = 111, 00:00 – 00:11)
            object_state = [0, 00:00 – 00:02, 27], [1, 00:02 – 00:05, 35], [2, 00:05-
            00:07,99], [3, 00:05 – 00:08,35], [4, 00:07- 00:08, 78], [5, 00:08-00:11,
            45]

absolute_location = [00:00 – 00:02,(11.34, 23.34, 23.87)], [00:02-
            00:07, (12.02, 21.23, 05.67)], [00:07-00:11, (12.10, 11.13, 05.45)]

relative_location = [112, 00:00 – 00:02, (2.7, 30°)], [113, 00:02-00:07,
            (12.7, 47°)], [114, 00:07-00:11, (11.13, 132°)]

absolute_motion = [00:00 – 00:02,($\vec{v}_1$)], [00:02-00:7, ($\vec{v}_2$)], [00:07-
            00:11, ($\vec{v}_3$)]

Relative_motion = [112, 00:00 – 00:02,($\vec{v}_4$)], [113, 00:02-00:7, ($\vec{v}_5$)],
            [113, 00:07-00:11, ($\vec{v}_6$)], [114, 00:08 – 00:11, $\overrightarrow{(v_7)}$]

for (object_ID = 112, 00:00 – 00:07)
            ...
```

FIG. 6B

SYSTEMS AND METHODS FOR GENERATING IMPROVED CONTENT BASED ON MATCHING MAPPINGS

CROSS-REFERENCE TO RELATED APPLICATION

This application is a continuation of U.S. patent application Ser. No. 18/108,741, filed Feb. 13, 2023, which is a continuation of U.S. patent application Ser. No. 16/844,511, filed Apr. 9, 2020, now U.S. Pat. No. 11,604,827, which claims the benefit of U.S. Provisional Patent Application No. 62/979,732, filed Feb. 21, 2020, which are hereby incorporated by reference in their entireties.

BACKGROUND

The present disclosure is directed to techniques for generating improved content, and more particularly to techniques for generating improved content by improving an appearance of an action by substituting an action with a matching fingerprint.

SUMMARY

Existing content providers such as traditional broadcasting networks, production companies, and over-the-top service providers often produce new content such as movies or television shows through audio/video capture of sets, filming actors and/or models. Furthermore, a large amount of content is generated by users of digital devices.

Commonly, in such content, a person will be filmed performing an action poorly or inexpertly. In one approach to correct this, a human artist will need to manually retouch the video, using manual 3D rendering and/or video editing tools, to make the actions appear to be performed well or expertly. Such modification is difficult and time-consuming.

In another common situation, a movie production will need to spend a significant amount of time, expense and effort to cast and film actors performing expert-level actions. Commonly, an actor who is cast will be unable to perform the needed action at the needed level of skill. In one approach, this problem may be solved by using manual post-production editing to improve the appearance of the action. In another approach, a "stunt double" will need to be hired and inserted into the film capture to deceive the viewer into thinking the actor is performing an expert action, and not the stunt double. This solution, however, remains time-consuming and computationally expensive because it requires filming multiple takes, and manual editing of the video such that the deception is believable to the end viewer. This solution will require labor-intensive work to splice shots containing the actors and shots containing the stunt double.

Accordingly, to solve this problem, techniques are disclosed herein for generating improved content by leveraging an existing library of content structures that already capture expert-level actions. For example, when a library of content structure that includes fully deconstructed content segments can be accessed to provide mapping fully describing an expert actions. Upon a request to improve an action in a content segment (e.g., in a video), the system will fingerprint the action and find an expert mapping that matches that fingerprint. Then the matching mapping can be used to replace a mapping of inexpert action in the initial content segment.

To achieve this matching of action mappings, deconstruction and reconstruction techniques may be used to generate the new content, based on a new content structure with altered attributes to provide, for the desired action motion mirroring the action attributes of an expert. Exemplary content structures that can be used for generating new content structures and rendered into a content segment are described by co-pending application Ser. No. 16/363,919 entitled "SYSTEMS AND METHODS FOR CREATING CUSTOMIZED CONTENT," filed on Mar. 25, 2019, which is hereby expressly incorporated by reference herein in its entirety.

To solve the problem of the aforementioned approaches, the system may seek to improve an action in a received content segment using a library of deconstructed content segments (e.g., a library of verified expert level actions). For example, a database of sports videos may be deconstructed using techniques of the '919 application.

To improve an appearance of action in a content segment, the system may deconstruct the content segment to create a first content structure. Such a content structure may include a first object with a first mapping that includes a first list of attributes values. For example, a movie is deconstructed into a first object having respective first attributes and first mappings. The system may then generate a first mapping based on the first list of attributes. The system may then search content structures for a matching content structure having a second object with a second mapping that matches the first mapping. For example, the matching may be accomplished by using AI-geared fingerprints as will be described below.

Upon finding a match, the system may generate a new content structure with the first object having the second object mapping from the matching content structure. The system may then generate for output a new content segment based on the newly generated content structure (e.g., by using a construction engine described in the '919 application). In this way, the original actions captured by the first mapping may be improved by substituting that mapping with a mapping that was based on video capture of an expert. In this manner, the depicted action is improved without the need of traditional manual retouching tools or employment of a stunt double.

In some embodiments, the disclosed techniques may be implemented by using fingerprint matching to search for a matching content structure. The system may generate a first mapping fingerprint based on the first list of attributes and the first mapping and a second mapping fingerprint based on the second list of attributes and the second mapping. Upon comparison, the second mapping fingerprint may match the first mapping fingerprint, which will result in a determination that the first mapping matches the second mapping.

In some embodiments, the disclosed techniques may implement a neural network (e.g., a discriminative neural network) to generate the first mapping (or the first mapping fingerprint). The system may provide a training dataset to train a neural network related to the first list of attributes. The system may then determine a set of parameters from the trained neural network based on the dataset. Once the set of parameters are determined, the system may search for matching content structures with the set of parameters from the trained neural network. For example, the neural network may be trained with a large dataset of specific types of mapping and related actions (e.g., baseball swings, soccer kicks, hockey slapshots, etc.). The neural network would be trained to recognize each action (e.g., as will be described below). The neural network may then be used by the system to identify an action from a plurality of content structures. The action identifier created via the neural network may be used the fingerprint.

In some embodiments, the disclosed techniques may generate several matching mappings. In this case, the system may generate for display a graphical user interface ("GUI") that includes a visual representation of each of the matching mappings. The system may receive a selection from the GUI of the visual representation of one of the GUI fingerprints. For example, if mappings of several expert-level actions are matched, the system will create a video for each mapping and allow the user to pick one. Upon the selection, the selected mapping will be used to generate a new content structure.

In some embodiments, the content structures further include virtual modelling data (e.g., vectoring data) for the objects and attribute table entries. The generation of a content segment may include determining matching virtual modelling data of the matching object including the identified attribute table entry. The content segment is rendered (e.g., a 2D or 3D animation) and generated for output based on the matching virtual modelling data. Exemplary content structures utilizing virtual modelling data are provided in co-pending application Ser. No. 16/451,823 entitled "SYSTEMS AND METHODS FOR CREATING CUSTOMIZED CONTENT", filed on Jun. 25, 2019, which is hereby expressly incorporated by reference herein in its entirety.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which:

FIGS. 6A-B provide pseudo-code examples of exemplary content structures, in accordance with some embodiments described herein;

DETAILED DESCRIPTION

Figure 1:
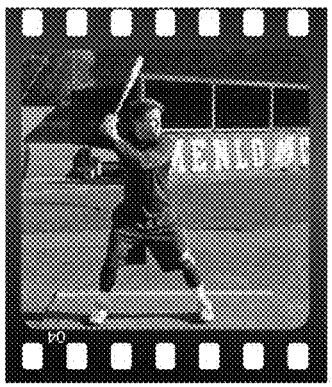
FIG. 1 shows an illustrative diagram for generating content based on matching mappings by implementing deconstruction and reconstruction techniques, in accordance with some embodiments of the disclosure.
Figure 1:
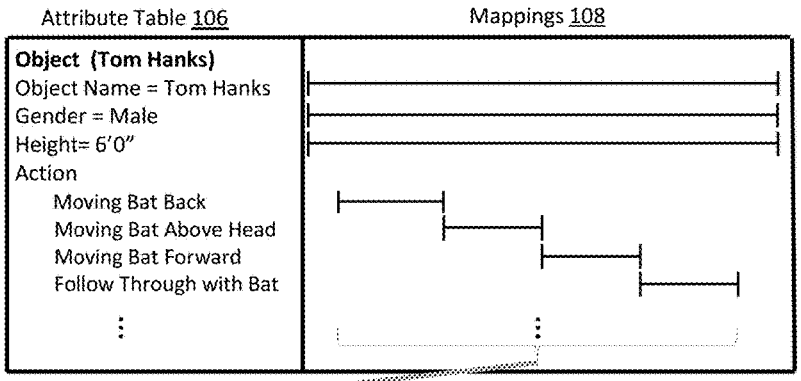
Figure 1:
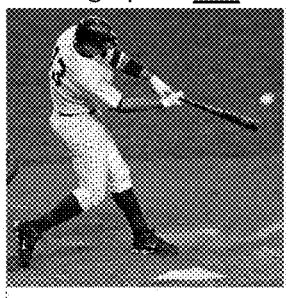
Figure 1:
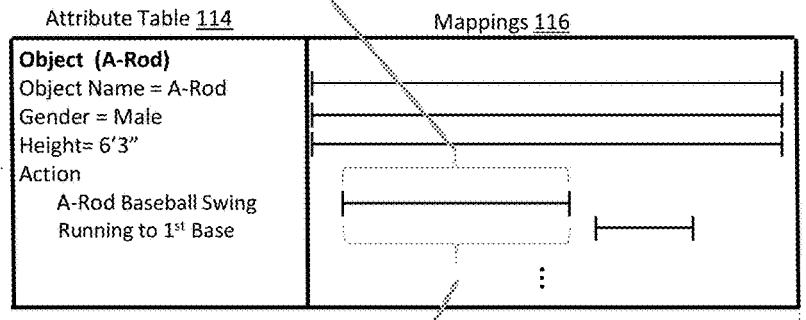
Figure 1:
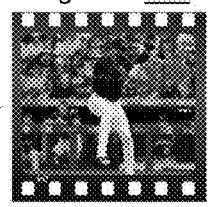

FIG. 1 shows an illustrative diagram 100 for generating content based on matching mappings by implementing deconstruction and reconstruction techniques, in accordance with some embodiments of the disclosure. A deconstruction engine may retrieve a content segment 102 (e.g., the clip of actor Tom Hanks swinging a baseball bat) from a data source to identify a plurality of objects. In some embodiments, Tom Hanks may have been filmed swinging at the ball as part of a movie production of a baseball movie. However, Tom Hanks is generally inexperienced at swinging the bat, and the filmed segment will show poor form. To improve this action, the techniques described above may be used.

A deconstruction engine (e.g., of the '823 application) may generate a content structure based on the Tom Hanks clip. For example, content structure 104 created based on content segment 102 may include an object named "Tom Hanks" that has a first list of attributes (shown in the attribute table 106). For example, the attributes may include an object name, gender, height, and action. Each of these attributes may have corresponding mappings (shown in the content structure 104 with mappings 108). Each of these mappings indicate their temporal presence of the corresponding attribute in the content segment. For example, the action attribute has a number of sub-action attributes including moving bat back, moving bat above head, moving bat forward, and follow through with bat. Each of these sub-actions has corresponding temporal mappings, which indicate when these sub-actions take place during the content segment (e.g., each of these actions are sequential in a baseball swing motion). As mentioned earlier, exemplary content structures that can be used for generating new content structures and rendered into a content segment are described by co-pending application Ser. No. 16/363,919 entitled "SYSTEMS AND METHODS FOR CREATING CUSTOMIZED CONTENT," filed on Mar. 25, 2019, which is hereby expressly incorporated by reference herein in its entirety.

A content improvement engine that includes control circuitry may retrieve this content structure (generated based on the Tom Hanks clip) as a first content structure that includes a first object with a first list of attributes and a first mapping including first attribute values corresponding to the first list of attributes. Returning to FIG. 1, the content improvement engine may retrieve content structure 104, which includes object "Tom Hanks" with a list of attributes under the attribute table 106 (e.g., object name, gender, height, action and sub-actions) and corresponding mappings under the mapping table 108. The Tom Hanks object is described as performing sub-actions of moving bat back, moving bat above head, moving bat forward, and follow through with bat by attribute table 106 and associated mappings 108. The content improvement engine may use a neural network to classify these action attributes as a "baseball swing" 110. In other embodiments, other disclosed techniques may be used to classify the action attributes such as a lookup database, a preprogrammed classifier algorithm, or other similar techniques for classification.

The content improvement engine may search a library of content structures (e.g., a library generated based on professional sports video clips) for a matching content structure. A matching content structure may include a second object with a second list of action attributes and corresponding second mapping. The second mapping may include second action attribute values corresponding to the second list of action attributes. For example, returning to FIG. 1, the content improvement engine may find content structure 112 as matching where the Alex Rodriguez ("A-Rod") baseball swing (captured under attribute table 114 and corresponding mapping table 116), which is also classified as a baseball swing 119 by a neural network, matches the baseball swing mapping 110 by the Tom Hanks object.

The content improvement engine may generate a new content structure that includes the first object from the first content structure with the second mapping including second attribute values. For example, a new content structure 120 may be for the object Tom Hanks (shown in attribute table 122) with the second attribute values of "A-Rod baseball swing" and corresponding mappings (shown in mapping 124). It should be noted that the object "Tom Hanks" may retain its other attributes such as height (e.g., 6'0"), facial features, clothing, hair color, etc., while the specific action attribute, namely the sub-actions, are now replaced with the A-Rod baseball swing.

A construction engine may generate for output a new content segment based on the new content structure. The output may be a media content type (e.g., a video, picture, graphics interchange format, or other type of media type). As mentioned earlier, exemplary content structures that can be used for generating new content structures and rendered into a content segment are described by co-pending application Ser. No. 16/363,919 entitled "SYSTEMS AND METHODS FOR CREATING CUSTOMIZED CONTENT," filed on Mar. 25, 2019, which is hereby expressly incorporated by reference herein in its entirety. For example, the construction engine may generate a new video clip, new content segment 126, of Tom Hanks swinging a baseball bat like A-Rod. In some embodiments, this new segment may be generated for display or transmitted over a network for display.

In some embodiments, the content improvement engine may generate a first mapping fingerprint based on the first list of attributes and the first mapping. Returning to FIG. 1, the content improvement engine may generate a first mapping fingerprint for the content segment based on the sub-actions where the fingerprint comprises the object name "Tom Hanks," the action attribute (e.g., moving bat back, moving bat above head, moving bat forward, and follow through with bat), and all corresponding mappings into a first mapping fingerprint. For example, the fingerprint may be an action classification performed by a neural network, as will be described below.

Generating fingerprints may be implemented by a variety of other techniques disclosed herein. In some embodiments, the fingerprint may be a hash value generated by hash codes. The hash code may be based on a cryptographic algorithm, or other suitable mathematical algorithms for the hash code. For example, values of the action attributes and the mappings (e.g., alphanumeric values) may be converted to data that is further converted into a hash value via the hash function utilizing the hash code. In other embodiments, the fingerprint may be represented by one or more matrices. The matrices may or may not be transformed by one or more mathematical operations to reduce the complexity of the matrices for ease of indexing. The one or more matrices may contain the action attributes and the mappings (e.g., alphanumeric values) of an action which may be simplified or reduced based on the application of one or more mathematical operations. In still other examples, a unique identifier generated by an identifier generator may be implemented where the values of the action attributes and the mappings (e.g., alphanumeric values) may be converted into a unique identifier.

In some embodiments, the content improvement engine may generate a second mapping fingerprint based on the second list of attributes and the second mapping. The second mapping fingerprint may match the first mapping fingerprint upon comparison. Returning to FIG. 1, the content improvement engine may generate a second mapping fingerprint for the content segment of A-Rod 118. The sub-actions of the resulting content structure 112 will comprise the object name "A-Rod," the action attribute (e.g., A-Rod baseball swing, and running to Pt base), and all corresponding mappings 116. Fingerprint matching may indicate to the system that mappings 108 and 116 match.

In some embodiments, the content improvement engine may generate the first mapping (and/or generate the mapping fingerprint) by providing a training dataset to train a neural network. In some embodiments, the training dataset may include known mappings with corresponding action identifiers. The content improvement engine may train a neural network to properly map mappings to action identifiers, as will be described in connection with FIG. 2B. The neural network may be any type of neural network suitable to determine a specific output given a training set. In some embodiments, the neural network may be a discriminative neural network including a discriminator module that assesses the accuracy of the attribute table relative to a model attribute/mapping.

Figure 2A:
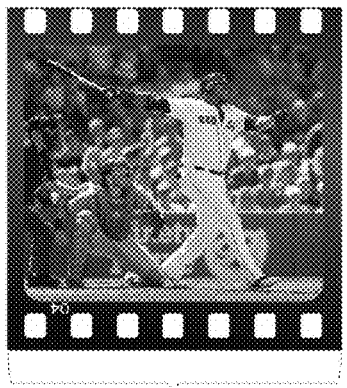
FIG. 2A shows an illustrative diagram for training a neural network with a training dataset, in accordance with some embodiments of the disclosure.
Figure 2A:
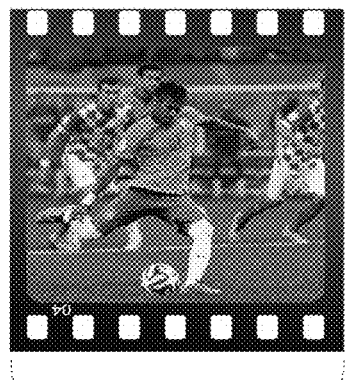
Figure 2A:
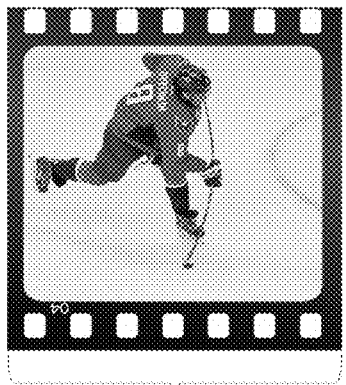
Figure 2A:
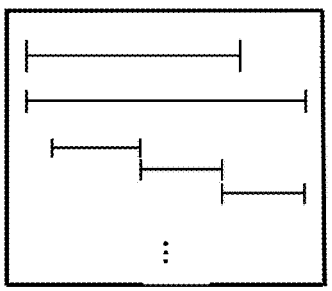
Figure 2A:
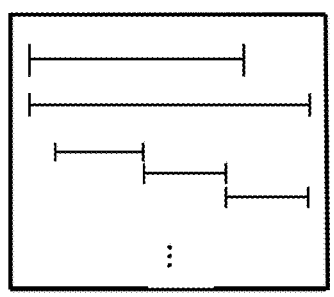
Figure 2A:
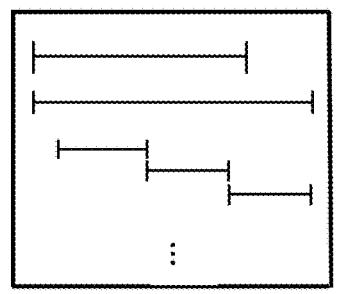
Figure 2A:
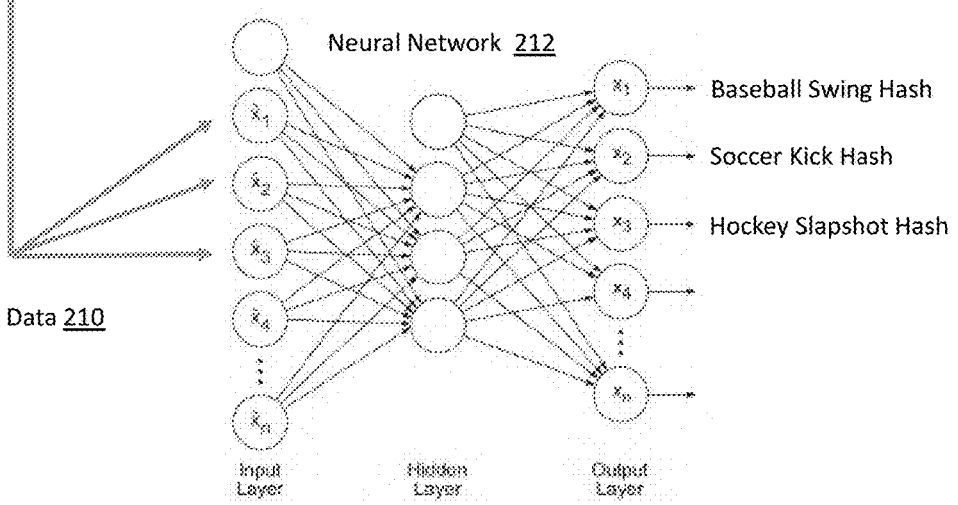

FIG. 2A shows an illustrative diagram 200 for training a neural network with a training dataset, in accordance with some embodiments of the disclosure. The content segment 202 may be a video segment known to depict a baseball swing. This content segment may be deconstructed into a content structure having corresponding attribute table with mappings 203 of the baseball swing. In similar fashion, content segment 204 is a video segment of a soccer kick, and content segment 206 is a video segment of a hockey slapshot. Each of these respective content segments may be deconstructed into respective content structures having respective attribute tables with mappings 205 and 207. One or more attribute tables may be used as training dataset 210 for the neural network 212. In some embodiments, the neural network is provided a training dataset with significant volume to achieve a predetermined accuracy threshold. For example, millions of video clips showing baseball swings may be deconstructed into attributes tables for the training dataset for the neural network. The neural network 212 receives the input attribute table and calculates, based on the weighted hidden layers, an output for the corresponding input. As shown in FIG. 2A, the input (denoted with a circumflex) for $\hat{x}_1$, which is the attribute table 203 (e.g., "baseball swing"), is output (denoted without a circumflex) as an $x_1$ baseball swing identifier. Similarly, $\hat{x}_2$ and $\hat{x}_3$, which were input as attribute tables 205 and 207, were output as $x_2$ soccer kick identifier and $x_3$ hockey slapshot identifier respectively. Depending on the configuration of the neural network, there may be $\hat{x}_n$ number of inputs with $x_n$ number of outputs.

In some embodiments, the search by the content improvement engine of the plurality of content structures for the matching content structure may include implementation of the neural network with the set of parameters from the trained neural network. For example, the neural network may utilize the set of parameters generated by the training set data to search for the matching content structure. In some embodiments, the neural network may require an achievement of a predetermined accuracy threshold by the set of parameters for a particular type of input, such as baseball bat swing attribute tables correctly identified as baseball swing actions. In some embodiments, the training of the neural network with the training dataset is conducted prior to searching for matching content structures. In other embodiments, the training of the neural network is simultaneously done while searching for matching content structures.

Figure 2B:
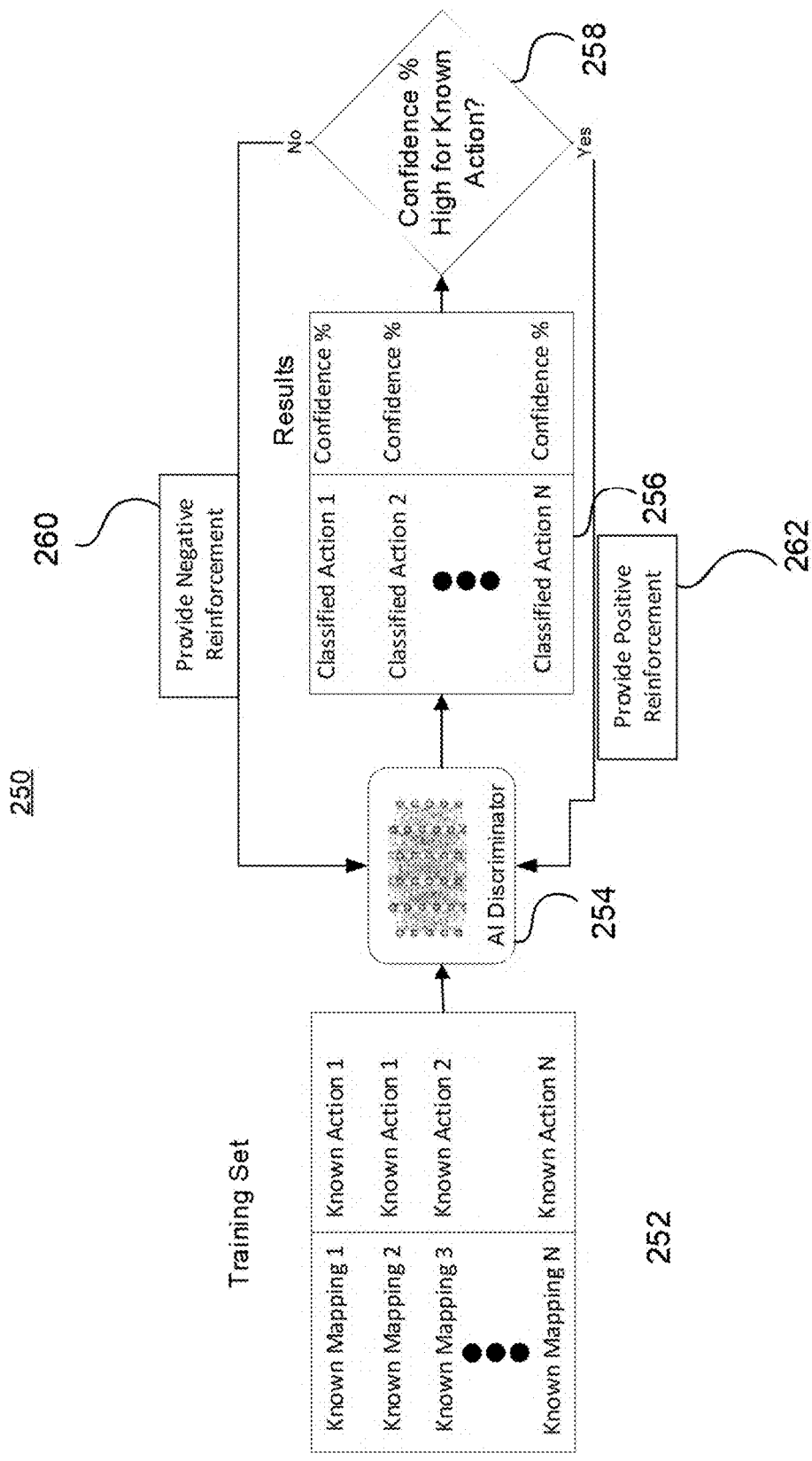
FIG. 2B shows another illustrative diagram for training a neural network with a training dataset, in accordance with some embodiments of the disclosure.

FIG. 2B shows another illustrative diagram 250 for training a neural network with a training dataset, in accordance with some embodiments of the disclosure. As shown, the training set 252 may include multiple known mappings, each with a known associated action identifier. The entries from training set 252 maybe fed in, one by one, as the initial layer of AI discriminator 254 (e.g., a neural net).

In some embodiments, the neural net will, after passing through hidden layers, generate an output layer 256. The output layer may list several classified actions (e.g., baseball swing, soccer kick, etc.) and associated confidence values. A confidence value of 100% will indicate absolute confidence in the classification, while a value of 0% will indicate absolute confidence that this is not the correct classification. For example, ideally, a mapping generated for a football kick, when fed into the AI discriminator 254, will generate a confidence value of 100% for the action "football kick" and confidences value for all other classified actions in output layer 256.

During training, other confidence values may appear. After each training example is inputted into the AI discriminator 254, the results are evaluated. At 258, if the confidence value in the known action is high (e.g., above a certain threshold), AI discriminator 254 will be positively reinforced 262. At 258, if the confidence value in the known action is low (e.g., below a certain threshold), AI discriminator 254 will be negatively reinforced 260.

Once the AI discriminator 254 is trained, it may be used for fingerprints for new mapping, e.g., for use in the techniques described in connection with FIG. 1. For example, a new mapping may be fed through AI discriminator 254 to generate an action identifier, which may be used as a fingerprint to match mappings to each other.

Returning, to FIG. 1, in some embodiments, the content improvement engine, when searching the plurality of content structures for a matching content structure, may find several matching structures. In this case, the content improvement engine may generate for display a GUI that includes several visual representations of the second matching mappings. For example, the machine engine may generate a GUI that contains three different baseball swings including A-Rod, Jose Bautista, and David Ortiz. In some embodiments, these swings may be generated by a construction engine. In some embodiments, a visual representation is generated of these potential matching content structures based on the list of attributes and mappings of each matching structure. For example, an animation of the baseball swings of A-Rod, Jose Bautista, and David Ortiz may be generated as thumbnails for aiding selection. The content improvement engine may receive a selection from the GUI of the visual representation of the selected mapping. Thus, searching for the matching content structure may include receiving a selection from a GUI of a second mapping to find a matching content structure.

In some embodiments, objects within the content structure may include attributes where one attribute is a vectorized representation of the object. Upon object identification, a content deconstruction engine may generate a vector data structure (e.g., set of vectors defining multiple polygons) based on each object. The vector data structure for an object may include data defining interconnected vectors or polygons, such that when those vectors or polygons are rendered or rasterized (e.g., by a graphics engine) the resulting rendering or raster represents the same object or resembles the object with sufficient similarity. The content deconstruction engine may generate a different vector set (e.g., three sets of vectors) for three different time periods. The vector sets may then be stored as part of the content structure.

In some embodiments, the vectorized representation of an object includes vectorized representation of a sub-portion of the object. Each object may be further subdivided into sub-objects, each having its own vector sets associated with sub-portions of the object. Each of these sub-objects may be separately vectorized and stored in content structure in the same way as other objects. Each of these sub-objects may have vector sets with associated relative location mappings defining the presence in different time periods.

In some embodiments, the deconstruction engine may modify the vectorized representation of the object comprising removing a portion of the vectors of the vectorized representation of the object and adding new vectors to the vectorized representation of the object. Because content structure fully defines vector sets for all objects, the objects may be fully reconstructed by a content construction engine from content structure. For example, a content construction engine may create a new content segment by reconstructing objects (e.g., by converting vectors to raster images) in a frame-by-frame manner. As mentioned previously, exemplary content structures utilizing virtual modelling data are provided in co-pending application Ser. No. 16/451,823 entitled "SYSTEMS AND METHODS FOR CREATING CUSTOMIZED CONTENT," filed on Jun. 25, 2019, which is hereby expressly incorporated by reference herein in its entirety.

Figure 2C:
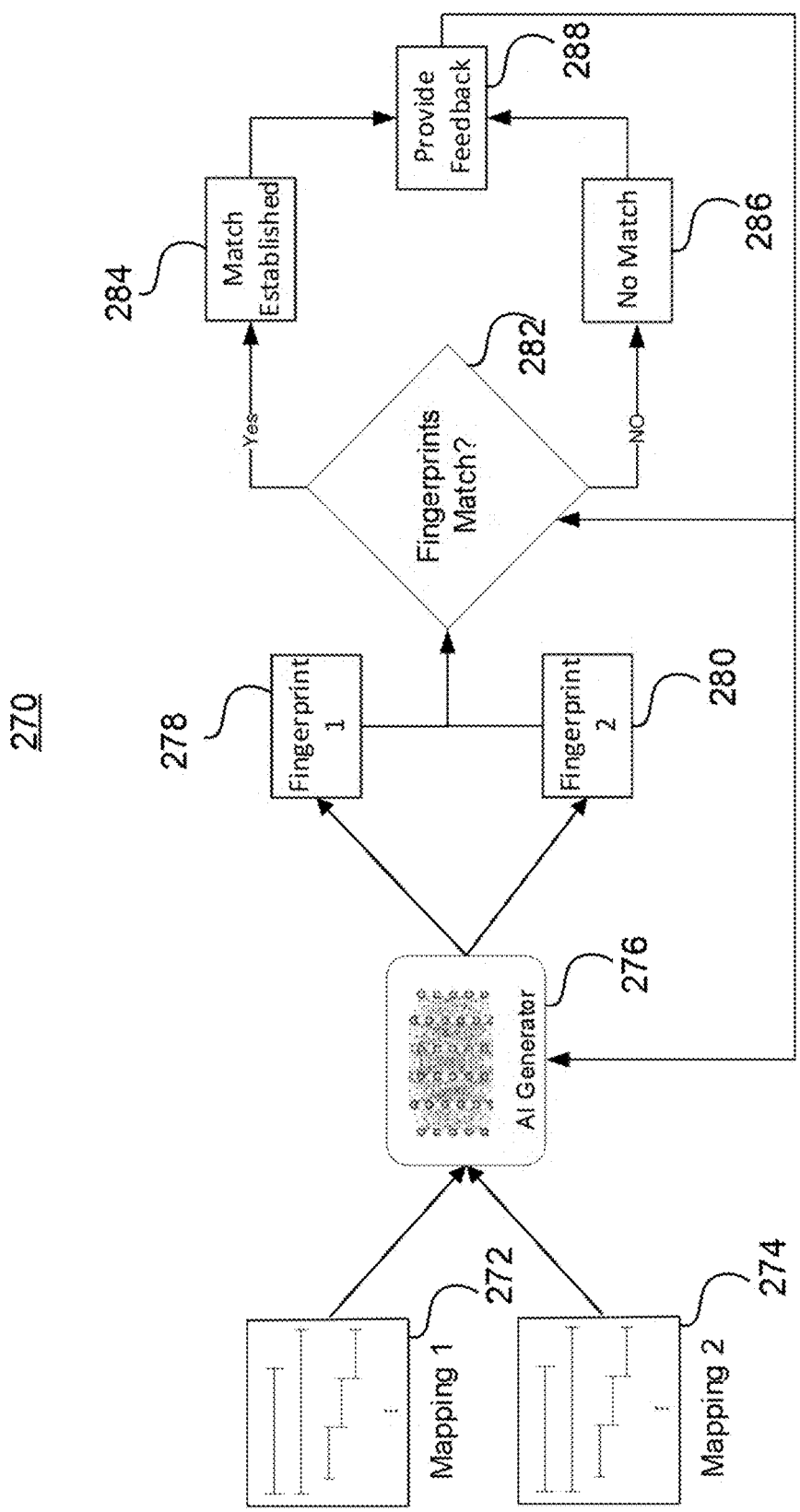
FIG. 2C shows an illustrative diagram for training and using a neural network to compare fingerprints, in accordance with some embodiments of the disclosure.

FIG. 2C shows an illustrative diagram 270 for training and using a neural network to compare fingerprints, in accordance with some embodiments of the disclosure. For example, technique for comparing fingerprints describe in FIG. 2C may be used to determine that mappings 108 is sufficiently similar to mappings 116. In this case, classifications 110 and 119 may be fingerprints or hashes generated by a specially trained AI generator (e.g., AI generator 276).

In some embodiments, AI generator 276 may be a generative neural network configured to accept as an input a mapping (e.g., one of mappings 108 or 116) and generate a fingerprint or a hash. In some embodiments, this may be accomplished by AI generator 276 being a neural network that has a last layer that includes fewer neurons than the input, which forces the network to summarize or compress the input into a smaller fingerprint output.

As shown, AI generator 276 may generate fingerprint 278 based on input of mapping 272 and to generate fingerprint 280 based on input of mapping 274. In some embodiments, the fingerprints are compared at step 282. For example, the system may check if the fingerprints differ by less than a threshold number of bits. In some embodiments, step 282 may be accomplished using a discriminating neural net configured to accept as input two fingerprints and to output whether they are matching or not. In this case, system 270 may operate as a Generative Adversarial Network (GAN). At step 284, a match may be established. In this case, matching mapping may be identified in matching content structure 112. At step 286, no match may be found, in which case, other mapping may be checked for a match.

In some embodiments, AI generator 276 (an optionally discriminating neural net in step 282) may be trained using a large input set of known mappings that encode matching actions. For example, a large number of mappings encoding a content segment that depicts a baseball swing may be used as training input. Additionally, a large number of mappings encoding a content segment that depicts different actions can be used.

When the neural networks are trained with known matching mapping, the system will operate as follows: Two known matching mappings are fed through AI generator 276. The resulting fingerprints are compared using a discriminating the neural net at step 282. If the results match at step 284, positive feedback is provided both to AI generator 276 and to neural net at step 288. If the results do not match at step 286, negative feedback is provided both to AI generator 276 and to neural net at step 288. The feedback may be used to adjust weights and/or connections in AI generator 276 and in discriminating neural net at step 282.

Similarly, when the neural networks are trained with known non-matching mappings, the system will operate as follows: Two known non-matching mappings are fed through AI generator 276. The resulting fingerprints are compared using discriminating neural net at step 282. If the results match at step 284, negative feedback is provided both to AI generator 276 and to neural net at step 288. If the results do no match at step 286, positive feedback is provided both to AI generator 276 and to neural net at step 288.

By training both AI generator 276 and discriminating neural net at step 288, the system may develop a GAN that may determine whether two mappings match or not with high degree of accuracy.

Figure 2D:
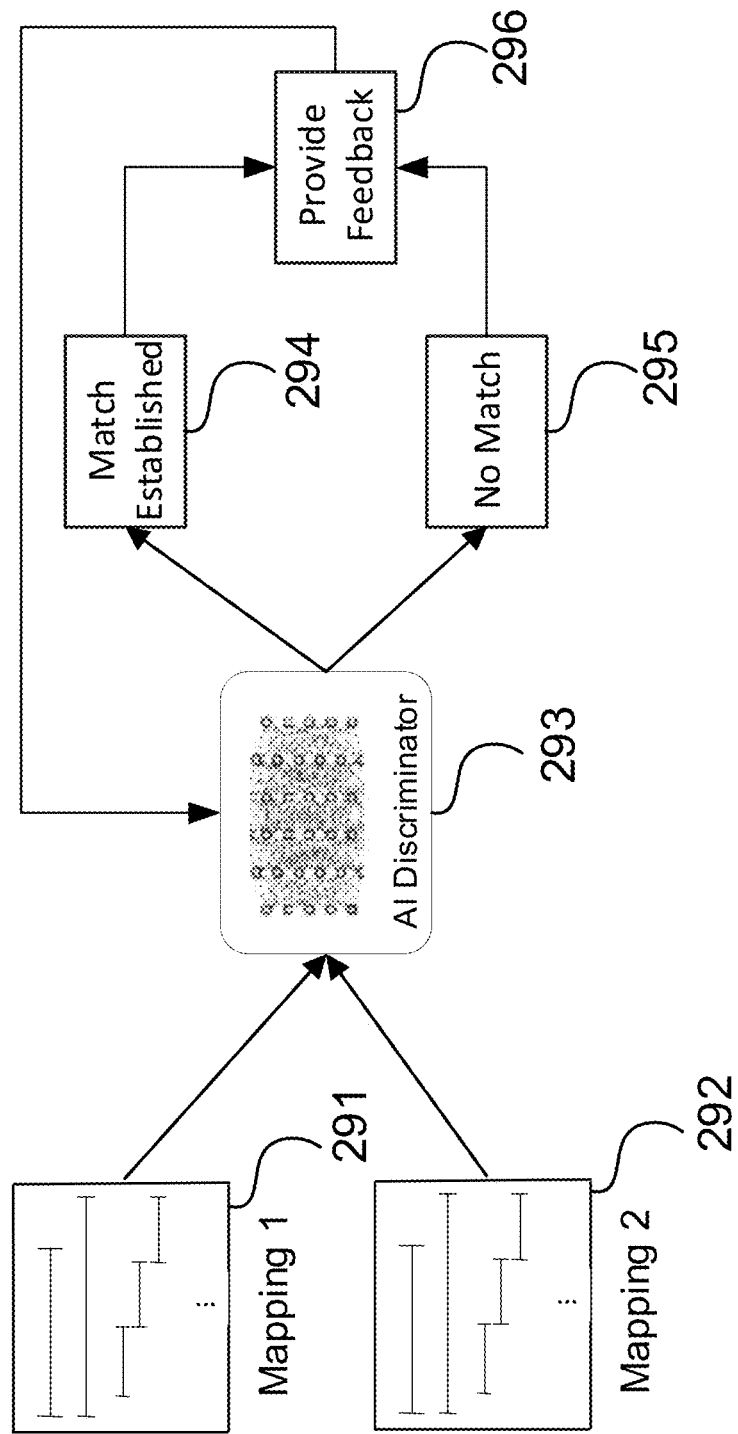
FIG. 2D shows another illustrative diagram for training and using a neural network to compare fingerprints, in accordance with some embodiments of the disclosure.

FIG. 2D shows another illustrative diagram 290 for training and using a neural network to compare fingerprints, in accordance with some embodiments of the disclosure. For example, the technique for comparing fingerprints described in FIG. 2C may be used to determine that mapping 108 is sufficiently similar to mapping 116. In this case, classifications 110 and 119 may be internal to an AI learning model (e.g., AI discriminator 293).

In some embodiments, AI discriminator 293 may be a discriminative neural network configured to accept as an input two mappings 291 and 292 (e.g., both mappings 108 or 116). In this case, AI discriminator 293 is trained to directly compare the mappings and return either an indication of a match being established 294 or an indication of mappings not matching 295.

In some embodiments, AI discriminator 293 may be trained using a large input set of known mappings that encode matching actions. For example, a large number of mappings encoding a content segment that depicts a baseball swing may be used as training input. Additionally, a large number of mappings encoding a content segment that depicts different actions can be used.

When the neural network of AI discriminator 293 is trained with known matching mappings, the system will operate as follows: Two known matching mappings are fed through AI discriminator 293. If the results match at step 294, positive feedback 296 is provided to AI discriminator 293. If the results do not match at step 295, negative feedback is provided to AI discriminator 293. The feedback may be used to adjust weights and/or connections in AI discriminator 293.

Similarly, when the neural network of AI discriminator 293 is trained with known non-matching mappings, the system will operate as follows: Two known non-matching mappings are fed through AI discriminator 293. If the results match at step 294, negative feedback 296 is provided to AI discriminator 293. If the results do no match at step 295, positive feedback is provided to AI discriminator 293. The feedback may be used to adjust weights and/or connections in AI discriminator 293. Once trained, AI discriminator 293 is capable of determining if unknown mappings match or not.

Figure 3:
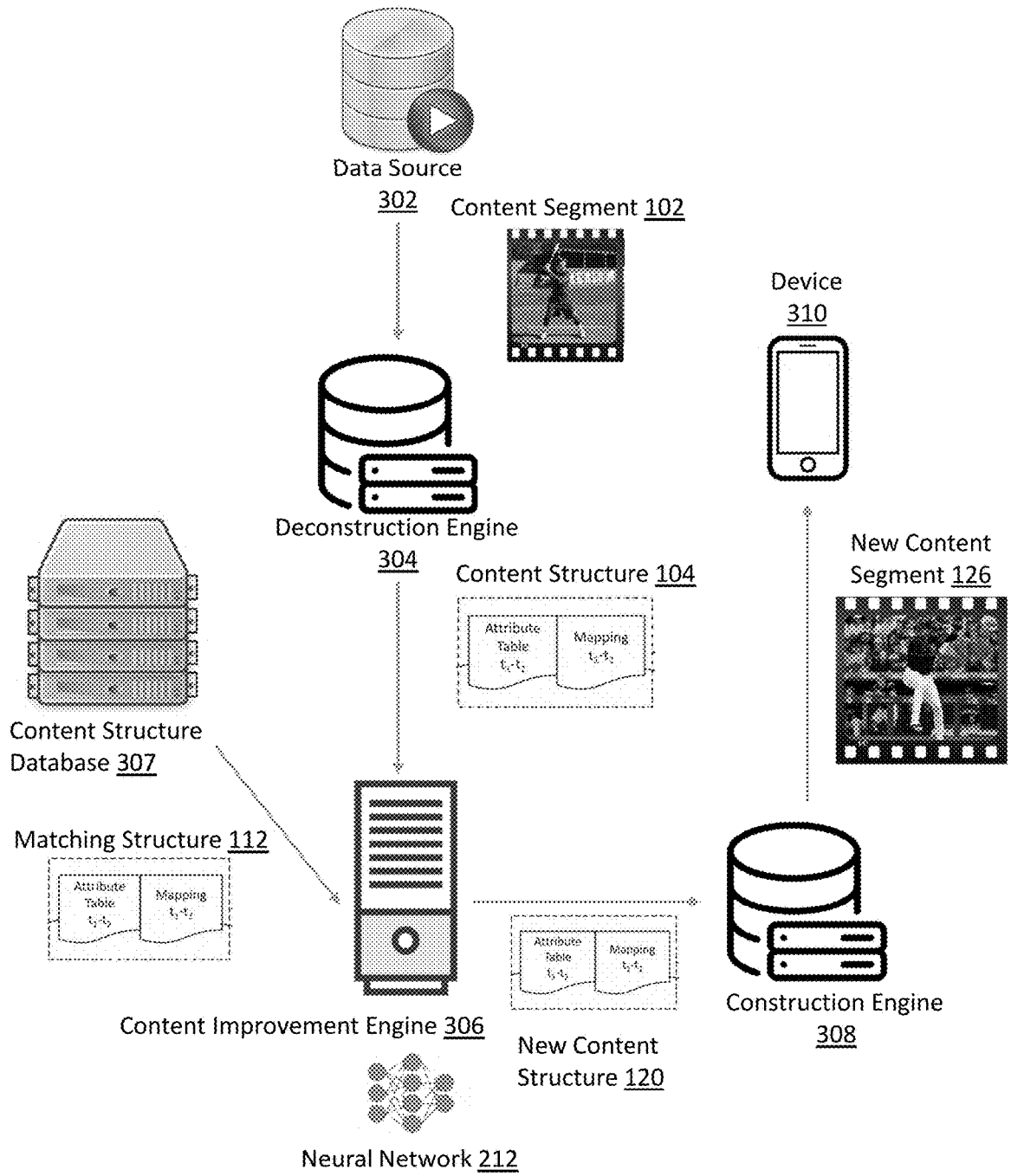
FIG. 3 shows an illustrative block system diagram, in accordance with some embodiments of the disclosure.
Figure 4:
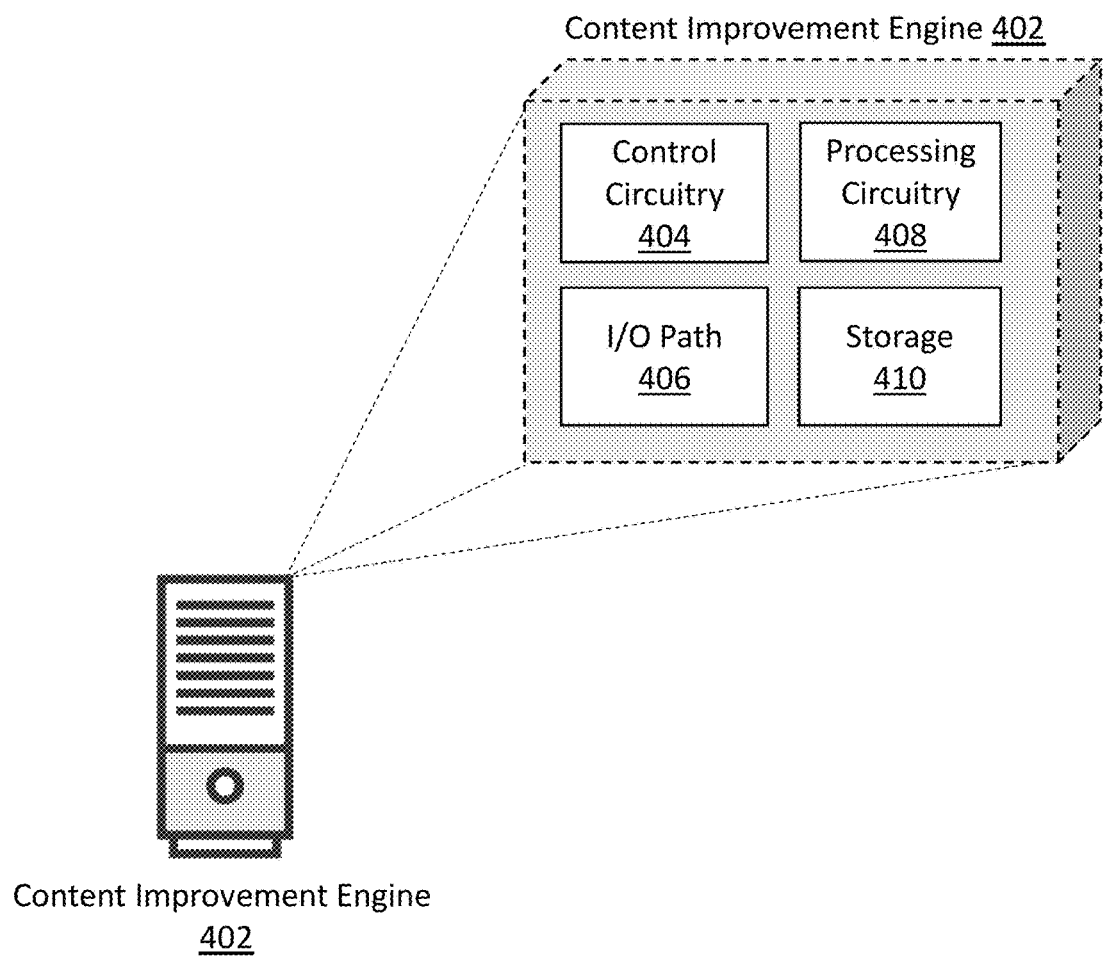
FIG. 4 shows an illustrative block diagram of a content improvement engine, in accordance with some embodiments of the disclosure.

FIG. 3 shows an illustrative system diagram 300 of the matching engine 306, data source 302, deconstruction engine 304, content structure database 307, construction engine 308, and device 310, in accordance with some embodiments of the disclosure. The content improvement engine 306 may be of any hardware that provides for processing and transmit/receive functionality. The content improvement engine may be communicatively coupled to one or more electronic devices (e.g., device 310). The content improvement engine may be communicatively coupled to a data source 302, a deconstruction engine 304, content structure database 307, and a construction engine 308. A further detailed disclosure on the content improvement engine can be seen in FIG. 4 showing an illustrative block diagram of the content improvement engine, in accordance with some embodiments of the disclosure.

In some embodiments, the content improvement engine may be implemented remote from the device 310 such as a cloud server configuration. The content improvement engine may be any device for retrieving information from the content structure database 307, content segments from the data source 302 and/or content structures from the deconstruction engine 304. The content improvement engine may be implemented by a Smart TV, a set-top box, an integrated receiver decoder (IRD) for handling satellite television, a digital storage device, a digital media receiver (DMR), a digital media adapter (DMA), a streaming media device, a local media server, a personal computer (PC), a laptop computer, a tablet computer, a WebTV box, a personal computer television (PC/TV), a PC media server, a PC media center, a hand-held computer, a portable video player, a portable music player, a portable gaming machine, a smart phone, virtual reality enabled device, augmented reality enabled device, mixed reality enabled device, or any other computing equipment, Internet-of-Things device, wearable device, or wireless device, and/or combination of the same. Any of the system modules (e.g., data source, deconstruction engine, content structure database, content improvement engine, construction engine, and electronic device) may be any combination of shared or disparate hardware pieces that are communicatively coupled.

In some embodiments, the construction engine 304 may be implemented remote from the electronic devices 306, 307, and 309 such as a cloud server configuration. The construction engine may be any device for accessing one or more content structures and generating content segments as described above. The construction engine may be implemented by a Smart TV, a set-top box, an integrated receiver decoder (IRD) for handling satellite television, a digital storage device, a digital media receiver (DMR), a digital media adapter (DMA), a streaming media device, a local media server, a personal computer (PC), a laptop computer, a tablet computer, a WebTV box, a personal computer television (PC/TV), a PC media server, a PC media center, a hand-held computer, a portable video player, a portable music player, a portable gaming machine, a smart phone, virtual reality enabled device, augmented reality enabled device, mixed reality enabled device, or any other computing equipment, Internet-of-Things device, wearable device, or wireless device, and/or combination of the same.

In some embodiments, the deconstruction engine 304 may be implemented remote from the electronic device 310 such as a cloud server configuration. The deconstruction engine may be any device for accessing the content segment from the data source 302 and generating content structures as described above. The deconstruction engine may be implemented by a Smart TV, a set-top box, an integrated receiver decoder (IRD) for handling satellite television, a digital storage device, a digital media receiver (DMR), a digital media adapter (DMA), a streaming media device, a local media server, a personal computer (PC), a laptop computer, a tablet computer, a WebTV box, a personal computer television (PC/TV), a PC media server, a PC media center, a hand-held computer, a portable video player, a portable music player, a portable gaming machine, a smart phone, virtual reality enabled device, augmented reality enabled device, mixed reality enabled device, or any other computing equipment, Internet-of-Things device, wearable device, or wireless device, and/or combination of the same.

The data source 302 may be any database, server, or computing device that contains content segments (e.g., movies, media content, etc.) that is transmitted to the deconstruction engine 304.

In some embodiments, the content structure database 307 may be implemented remote from the content improvement engine 306 such as a cloud server configuration. The content structure database may be any device for transmitting content structures and/or mapping fingerprints to the content improvement engine 306. The content structure database 307 may be implemented by a third-party server, computer network, cloud network, or other storage and/or server means.

In some embodiments, the content improvement engine 306, deconstruction engine 304, and construction engine 308 may be implemented within a single local device. Any of the system modules (e.g., content improvement engine 306, deconstruction engine 304, construction engine 308, device 310, data source 302, and content structure database 307) may be any combination of shared or disparate hardware pieces that are communicatively coupled.

The one or more electronic devices (e.g., device 310) may be any computing device that includes circuitries configured to transmit/receive network data (e.g., via any kind of a network port or ports), as well as circuitries configured to display or present an interface to view content items. For example, device 310 may present content via one or more of a touch screen, speakers, keyboard, voice command input and confirmation, virtual reality interface, augmented reality interface, any other. Device 310 may be implemented by a Smart TV, a set-top box, an integrated receiver decoder (IRD) for handling satellite television, a digital storage device, a digital media receiver (DMR), a digital media adapter (DMA), a streaming media device, a local media server, a personal computer (PC), a laptop computer, a tablet computer, a WebTV box, a personal computer television (PC/TV), a PC media server, a PC media center, a hand-held computer, a portable video player, a portable music player, a portable gaming machine, a smart phone, virtual reality enabled device, augmented reality enabled device, mixed reality enabled device, or any other computing equipment, Internet-of-Things device, wearable device, or wireless device, and/or combination of the same FIG. 4 shows an illustrative block diagram 400 of the content improvement engine, in accordance with some embodiments of the disclosure. In some embodiments, the content improvement engine may be communicatively connected to a user interface. In some embodiments, the content improvement engine may include processing circuitry, control circuitry, and storage (e.g., RAM, ROM, hard disk, removable disk, etc.). The content improvement engine may include an input/output path 406. I/O path 406 may provide device information, or other data, over a local area network (LAN) or wide area network (WAN), and/or other content and data to control circuitry 404, that includes processing circuitry 408 and storage 410. Control circuitry 404 may be used to send and receive commands, requests, signals (digital and analog), and other suitable data using I/O path 406. I/O path 406 may connect control circuitry 404 (and specifically processing circuitry 408) to one or more communications paths.

Control circuitry 404 may be based on any suitable processing circuitry such as processing circuitry 408. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a content improvement engine stored in memory (e.g., storage 410).

Memory may be an electronic storage device provided as storage 410, that is part of control circuitry 404. As referred to herein, the phrase "electronic storage device" or "storage device" should be understood to mean any device for storing electronic data, computer software, or firmware, such as random-access memory, read-only memory, hard drives, solid state devices, quantum storage devices, or any other suitable fixed or removable storage devices, and/or any combination of the same. Nonvolatile memory may also be used (e.g., to launch a boot-up routine and other instructions).

The content improvement engine 402 may be coupled to a communications network. The communication network may be one or more networks including the Internet, a mobile phone network, mobile voice or data network (e.g., a 5G, 4G or LTE network), mesh network, peer-to-peer network, cable network, or other types of communications network or combinations of communications networks. The content improvement engine may be coupled to a secondary communication network (e.g., Bluetooth, Near Field Communication, service provider proprietary networks, or wired connection) to the selected device for generation for playback. Paths may separately or together include one or more communications paths, such as a satellite path, a fiber-optic path, a cable path, a path that supports Internet communications, free-space connections (e.g., for broadcast or other wireless signals), or any other suitable wired or wireless communications path or combination of such paths.

Figure 5:
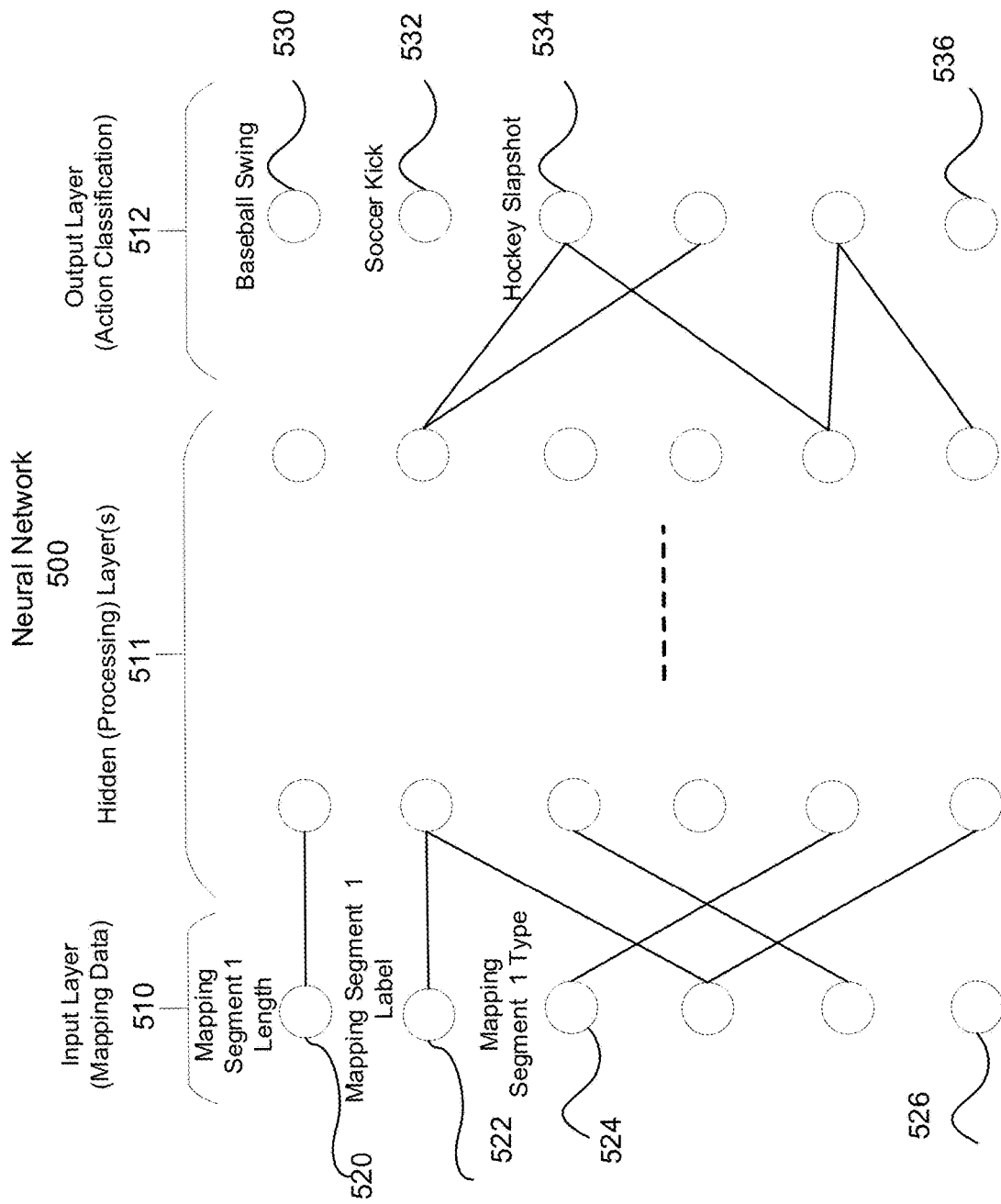
FIG. 5 provides an example diagram illustrating the process of training and generating content structure via an artificial neural network, in accordance with some embodiments described herein.

FIG. 5 provides an example diagram illustrating the process of training and generating a content structure via an artificial neural network, according to some embodiments described herein. An artificial neural network may be trained to recognize objects, scenes, audios, settings, effects, etc., from a content segment. The content segment can then be fed to the input layer 510 of the artificial neural network. For example, different parts of mappings 520-526 may be included as the initial input layer 510. In some embodiments, features 520-526 may be copied from a data structure describing the mappings, e.g., as depicted in FIG. 6B. The artificial neural network may be trained to identify the common pattern from different visualizations via processing at one or more hidden layers 511. Thus, by identifying objects, scenes, audios, settings, effects, etc., from the content segment, an action classification may be generated at the output layer 512. Output layer 512 may include nodes representing a set of action identifiers 530-536. The output may be binary (e.g., setting the correct node in layer 512 to "1" and all incorrect nodes to "0"). In some embodiments, the output may be fractional (e.g., setting a confidence value for each node in layer 512 to "1" and all incorrect nodes to "0").

In some embodiments, the hidden layers 511 may be modified by removing or adding connections during the training process (e.g., as shown in FIG. 2B). In some embodiments, layers 511 may be fully connected. In this case, during the training process (e.g., as shown in FIG. 2B), the weights of each connection may be modified, e.g., during negative or positive reinforcement 260 or 262.

FIGS. 6A-B provide pseudo-code examples of content structure 133, according to some embodiments described herein. Content structure 133 may be stored in a structured data format compatible with XML, JSON, Python, etc. For example, FIG. 6A shows an example segment of attribute table 131 that lists a hierarchical structure of data fields for the attribute table 131, under which object data structure 134 is listed, under which the description structure is listed, under which an object 111 is listed, under which a number of features of the object are listed, and so on.

FIG. 6B shows an example segment of mapping 132. For example, mapping 132 specifies the object identifier for object 111, and the presence indicator of a time duration "0:00-00:11" during which object 111 is present within the content segment 122a. Mapping 132 also specifies a mapping for the object state attribute, e.g., [0, 00:00-00:02, 27] indicates a state of code "0" (e.g., referring to the state of "determined") having a degree of "27" (e.g., 27 out of 100, referring to "moderately determined") during the time duration "00:00-00:02." The state mapping may change to [1, 00:02-00:05, 35], which indicates a state of code "1" (e.g., referring to the state of "intense") having a degree of "35" (e.g., 35 out of 100 level of "intense") during time duration "00:02-00:05," and so on.

Figure 7:
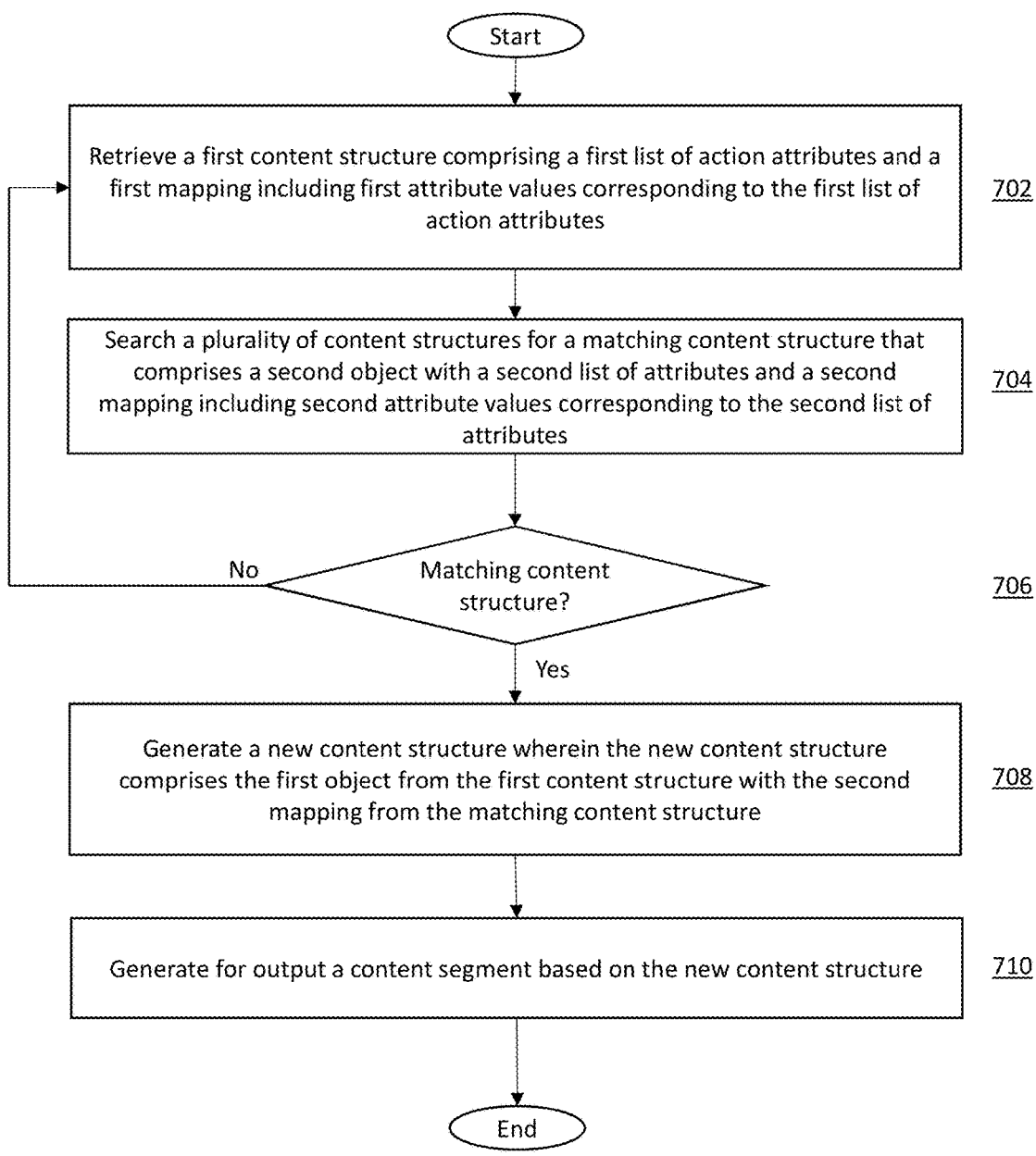
FIG. 7 is an illustrative flowchart of a process for generating graphical representations from data of content segments, in accordance with some embodiments described herein.

FIG. 7 is an illustrative flowchart of a process for generating graphical representations from data of content segments, in accordance with some embodiments of the disclosure. Process 700, and any of the following processes, may be executed by control circuitry 404 (e.g., in a manner instructed to control circuitry 404 by the content improvement engine 402 and/or construction engine 308 and/or deconstruction engine 304). Control circuitry 404 may be part of the content improvement engine, or of a remote server separated from the content improvement engine by way of a communication network or distributed over a combination of both.

At 702, the content improvement engine 402, by control circuitry 404, retrieves a first content structure comprising a first object with a first list of attributes and a first mapping including first attribute values corresponding to the first list of attributes. In some embodiments, the content improvement engine retrieves the content structure via the I/O path 406 from a data source 302.

At 704, the content improvement engine 402, by control circuitry 404, searches a plurality of content structures for a matching content structure that comprises a second object with a second list of attributes and a second mapping including second attribute values corresponding to the second list of attributes. In some embodiments, the content improvement engine searches the plurality of content structures for the matching content structure, at least in part, by implementing processing circuitry 408. In some embodiments, the content improvement engine searches the plurality of content structures via the I/O path 406 from a data source 302. In some embodiments, the content improvement engine searches the plurality of content structures via the I/O path 406 from the content structure database 307.

At 706, the content improvement engine 402, by control circuitry 404, determines whether a content structure is matching. If, at 706, control circuitry determines "No," the content structure is not matching, the process reverts to step 702.

If, at 706, control circuitry determines "Yes," the content structure is matching, the process advances to step 708. At 708, the content improvement engine 402, by control circuitry 404, generates a new content structure wherein the new content structure comprises the first object from the first content structure with the second mapping from the matching content structure. In some embodiments, the generating of a new content structure by the content improvement engine 402 is performed, at least in part, by implementing processing circuitry 408.

At 710, the content improvement engine 402, by control circuitry 404, generates for output a new content segment based on the new content structure. In some embodiments, the content improvement engine 402 generates for output the new content segment via the I/O path 406 to a device 310.

Figure 8:
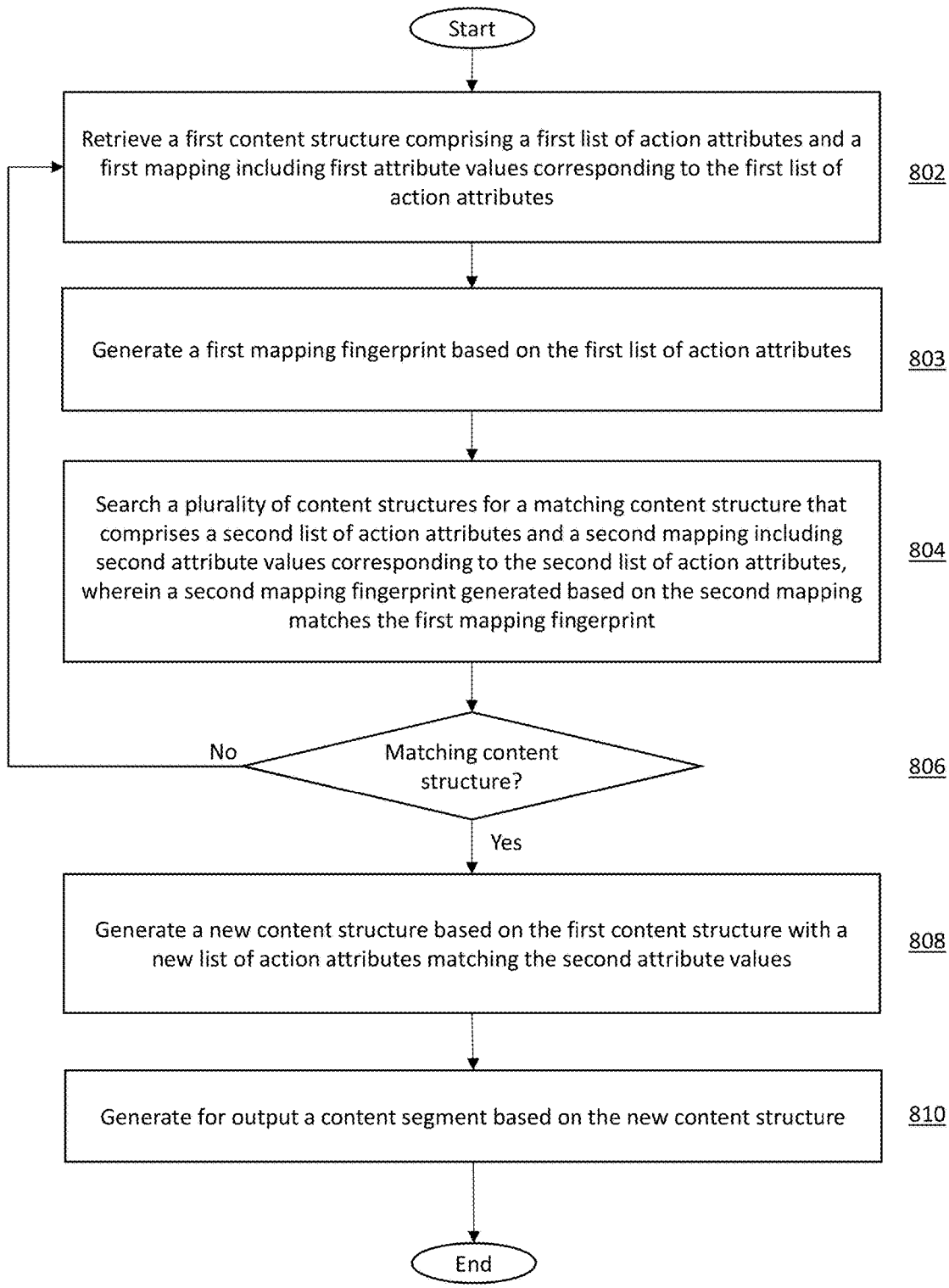
FIG. 8 is an illustrative flowchart of another process for generating graphical representations from data of content segments, in accordance with some embodiments described herein.

FIG. 8 is an illustrative flowchart of another process for generating graphical representations from data of content segments, in accordance with some embodiments of the disclosure. At 802, the content improvement engine 402, by control circuitry 404, retrieves a first content structure comprising a first object with a first list of attributes and a first mapping including first attribute values corresponding to the first list of attributes. In some embodiments, the content improvement engine retrieves the content structure via the I/O path 406 from a data source 302.

At 803, the content improvement engine 402, by control circuitry 404, generates a first mapping fingerprint based on the first list of action attributes. In some embodiments, the generating of the first mapping fingerprint is performed, at least in part, by implementing processing circuitry 408.

At 804, the content improvement engine 402, by control circuitry 404, searches a plurality of content structures for a matching content structure that comprises a second list of action attributes and a second mapping including second attribute values corresponding to the second list of action attributes, wherein a second mapping fingerprint generated based on the second mapping matches the first mapping fingerprint. In some embodiments, the content improvement engine searches the plurality of content structures for the matching content structure, at least in part, by implementing processing circuitry 408. In some embodiments, the content improvement engine searches the plurality of content structures via the I/O path 406 from a data source 302. In some embodiments, the content improvement engine searches the plurality of content structures via the I/O path 406 from the content structure database 307.

At 806, the content improvement engine 402, by control circuitry 404, determines whether a content structure is matching. If, at 806, control circuitry determines "No," the content structure is not matching, the process reverts to step 802.

If, at 806, control circuitry determines "Yes," the content structure is matching, the process advances to step 808. At 808, the content improvement engine 402, by control circuitry 404, generates a new content structure based on the first content structure with a new list of action attributes matching the second attribute values. In some embodiments, the generating a new content structure by the content improvement engine 402 is performed, at least in part, by implementing processing circuitry 408.

At 810, the content improvement engine 402, by control circuitry 404, generates for output a new content segment based on the new content structure. In some embodiments, the content improvement engine 402 generates for output the new content segment via the I/O path 406 to a device 310.

Figure 9:
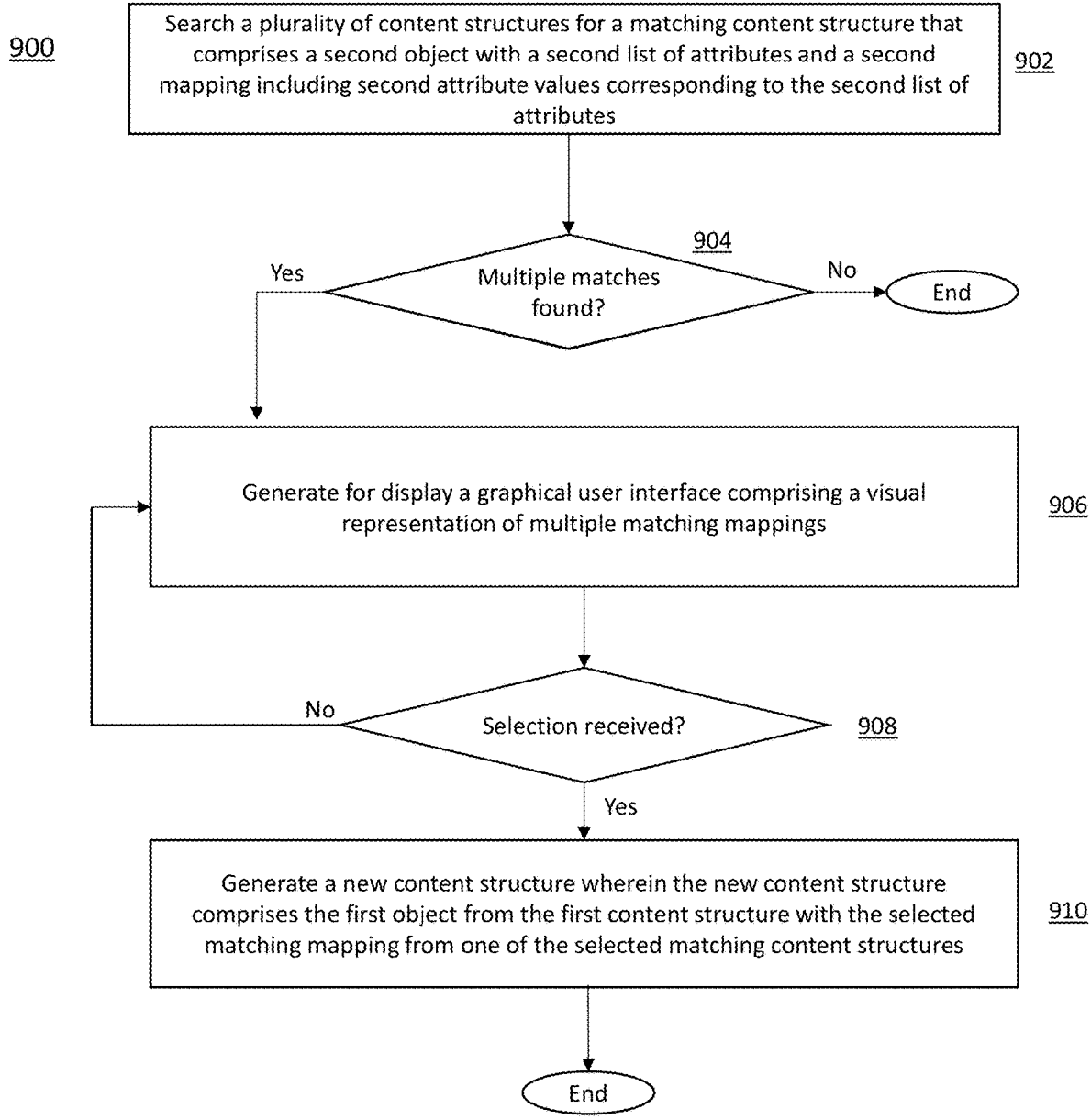
FIG. 9 is an illustrative flowchart of a process for generating content based on matching fingerprint mappings, in accordance with some embodiments described herein.

FIG. 9 is an illustrative flowchart of a process for generating content based on matching fingerprint mappings, in accordance with some embodiments of the disclosure. At 902, the content improvement engine 402, by control circuitry 404, searches a plurality of content structures for a matching content structure that comprises a second object with a second list of attributes and a second mapping including second attribute values corresponding to the second list of attributes.

At 904, control circuitry 404 may determine that multiple matches are identified. If so, process 900 proceeds to 906; otherwise process 900 ends.

At 906, the content improvement engine 402, by control circuitry 404, generates for display a graphical user interface comprising several visual representations of the matching mappings. For example, the visual representations may be generated via a construction engine. In some embodiments, the generation of the graphical user interface is performed, at least in part, by processing circuitry 408. In some embodiments, the generation for display may be via the I/O path 406 to device 310. In some embodiments, the generation for display may be for the content improvement engine.

The content improvement engine determines whether a selection from the graphical user interface of the visual representation is received. If, at 908, control circuitry determines "No," selection from the graphical user interface of the visual representation of the second mapping was not received, the process reverts to 906.

If, at 908, control circuitry determines "Yes," selection from the graphical user interface of the visual representation of a selected mapping was received, the process advances to 910. At 910, content improvement engine 402, by control circuitry 404, generates a new content structure wherein the new content structure comprises the first object from the first content structure with the selected matching mapping from one of the selected matching content structures. This step may be performed as described in relation to step 120 of FIG. 1.

It is contemplated that the steps or descriptions of FIGS. 7-9 may be used with any other embodiment of this disclosure. In addition, the steps and descriptions described in relation to FIGS. 7-9 may be done in suitable alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 3 and 4 could be used to perform one or more of the steps in FIGS. 7-9.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   identifying, in a first video segment, a first character performing an action, wherein the action comprises a sequence of sub-actions;
   accessing a first mapping associated with the first video segment, wherein the first mapping indicates first action attribute values and time periods of the first action attribute values corresponding to the sequence of sub-actions;
   inputting the first action attribute values and the time periods of the first action attribute values of each sub-action to a neural network model;
   determining, using the neural network model, an action identifier for the sequence of sub-actions;
   searching, based on the action identifier, a content database for a plurality of mappings associated with respective video segments;
   comparing, using the neural network model, each mapping of the plurality of mappings to the first mapping;
   determining, based on the comparing using the neural network model, a second mapping that matches the first mapping, wherein the second mapping is associated with a second video segment depicting a second character performing the action, and wherein the second mapping indicates second action attribute values and time periods of the second action attribute values corresponding to the second character performing the action;
   generating, based on the first and the second mappings, a third mapping that indicates the second action attribute values and time periods of the second action attribute values, wherein the third mapping is associated with a video segment depicting the first character performing the action based on the second action attribute values and time periods of the second action attribute values;
   retrieving a content structure comprising an object corresponding to the first character, wherein the content structure comprises virtual modelling data corresponding to the first character; and
   modifying the virtual modelling data based on the third mapping.

2. The method of claim 1, further comprising generating, based on the modified virtual modelling data, a reconstructed first character performing the action based on the second action attribute values and time periods of the second action attribute values.

3. A method comprising:
  identifying, in a first video segment, a first character performing an action, wherein the action comprises a sequence of sub-actions;
  accessing a first mapping associated with the first video segment, wherein the first mapping indicates action attribute values and time periods of the action attribute values corresponding to the sequence of sub-actions;
  inputting the action attribute values and the time periods of the action attribute values of each sub-action to a neural network model;
  determining, using the neural network model, an action identifier for the sequence of sub-actions;
  searching, based on the action identifier, a content database for a plurality of mappings associated with respective video segments;
  generating a first fingerprint based on the first mapping;
  comparing, using the neural network model, each mapping of the plurality of mappings to the first mapping, wherein comparing the each mapping of the plurality of mappings to the first mapping comprises:
    generating a respective fingerprint based on the each mapping; and
    comparing the first fingerprint and the respective fingerprint; and
  determining, based on the comparing using the neural network model, a second mapping that matches the first mapping, wherein the second mapping is associated with a second video segment depicting a second character performing the action.

4. The method of claim 1, wherein the action identifier comprises an action keyword based on the sequence of sub-actions.

5. The method of claim 1, wherein the content database comprises deconstructed video segments depicting expert actions.

6. The method of claim 1, further comprising generating for display visual representations of the each mapping of the plurality of mappings.

7. The method of claim 6, wherein the visual representations are displayed on a graphical interface.

8. A system comprising:
  one or more input/output (I/O) paths configured to access content; and
  control circuitry configured to:
    identify, in a first video segment, a first character performing an action, wherein the action comprises a sequence of sub-actions;
    access a first mapping associated with the first video segment, wherein the first mapping indicates first action attribute values and time periods of the first action attribute values corresponding to the sequence of sub-actions;
    input the first action attribute values and the time periods of the first action attribute values of each sub-action to a neural network model;
    determine, using the neural network model, an action identifier for the sequence of sub-actions;
    search, based on the action identifier via the one or more I/O paths, a content database for a plurality of mappings associated with respective video segments;
    compare, using the neural network model, each mapping of the plurality of mappings to the first mapping;
    determine, based on the comparing using the neural network model, a second mapping that matches the first mapping, wherein the second mapping is associated with a second video segment depicting a second character performing the action, and wherein the second mapping indicates second action attribute values and time periods of the second action attribute values corresponding to the second character performing the action;
    generate, based on the first and the second mappings, a third mapping that indicates the second action attribute values and time periods of the second action attribute values, wherein the third mapping is associated with a video segment depicting the first character performing the action based on the second action attribute values and time periods of the second action attribute values;
    retrieve a content structure comprising an object corresponding to the first character, wherein the content structure comprises virtual modelling data corresponding to the first character; and
    modify the virtual modelling data based on the third mapping.

9. The system of claim 8, wherein the control circuitry is further configured to generate, based on the modified virtual modelling data, a reconstructed first character performing the action based on the second action attribute values and time periods of the second action attribute values.

10. The system of claim 8, wherein the control circuitry is further configured to:
  generate a first fingerprint based on the first mapping; and
  wherein the control circuitry is configured to compare the each mapping of the plurality of mappings to the first mapping by:
    generating a respective fingerprint based on the each mapping; and
    comparing the first fingerprint and the respective fingerprint.

11. The system of claim 8, wherein the action identifier comprises an action keyword based on the sequence of sub-actions.

12. The system of claim 8, wherein the content database comprises deconstructed video segments depicting expert actions.

13. The system of claim 8, wherein the control circuitry is further configured to generate for display visual representations of the each mapping of the plurality of mappings.

14. The system of claim 13, wherein the visual representations are displayed on a graphical interface.

* * * * *